Aug. 2, 1949.　　　　H. GUTTON　　　　2,477,694
RADIO WAVES RADIATORS
Filed July 19, 1946
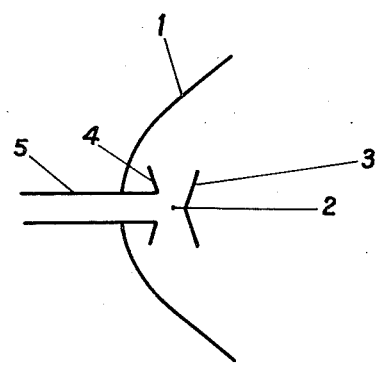
Inventor
HENRI GUTTON
By Haseltine, Lake & Co.
Attorneys Patented Aug. 2, 1949

2,477,694

UNITED STATES PATENT OFFICE 2,477,694

RADIO WAVES RADIATORS

Henri Gutton, Paris, France, assignor to Compagnie Generale de Telegraphie Sans Fil, a corporation of France Application July 19, 1946, Serial No. 684,814
In France June 15, 1940

Section 1, Public Law 690, August 8, 1946
Patent expires June 15, 1960

3 Claims. (Cl. 250—33.65)

The object of this invention consists in a new system for radiating radio waves, more particularly applicable to the ultra-short waves band, for instance of the decimeter order.

There is known a system which consists in a combination of a parabolic mirror and of a dipole disposed in the focus of said mirror. However, the mirror surface is not well used in this combination, which becomes obvious after considering the radiation pattern of the dipole. Moreover, an important part of the energy which is radiated by the dipole, traverses the opening of the mirror without reflecting on the latter, and is lost for the directed beam.

According to this invention, a wave radiator is formed by a metallic reflector, having preferably a parabolic surface, containing within it, on both sides of its focus, a system of two metallic cones having their apices directed one to another. The cone which is nearest to the mirror apex is truncated, and the edges of the truncated aperture join a pipe which serves for connection with an energy feeder, which is equally of the hollow pipe type.

The invention will be more easily understood by means of the annexed drawing which shows an example of an embodiment thereof.

According to the figure, a parabolic metallic mirror 1, having its focus at 2, contains two metallic elements 3 and 4 having conical surfaces, their apices being mutually opposed. These apices are placed near the focus 2 on both sides thereof, and their respective distance is preferably adjustable. The cone 4, which is nearest to the mirror apex, is limited to a truncated cone having a central aperture the edges of which are joined to a cylindrical pipe element 5, which serves for connection with an energy feeder of the hollow pipe type, which feeds to the system the radio energy to be radiated.

The mirror may be of a paraboloidal or cylindrical parabolic form.

The radiator according to the invention permits to obtain the following results or advantages.

For a given apparatus volume and for a given distance, the field gain is very important as compared with known systems comprising dipoles in a mirror, even with the most improved systems. In the experimental measures made by the applicant, it has been determined that the field with the new system was double of the field in the known systems.

Moreover, the patterns are more concentrated and more symmetrical, with a very great attenuation of lateral lobes.

Finally, the system is so constituted that it may be adapted to a direct excitation through a guiding pipe.

What I claim is:

1. A device for radiating ultra-high frequency waves comprising in combination: a parabolic mirror, a wave guide having an apertured end located in close proximity to the focus of said mirror, and a conical reflector facing the said apertured end located outwardly of the focus along the axis of said mirror and near to the focus and in the interior of the boundaries of said mirror, the base section of this reflector being substantially less than the mirror opening, the apex of said reflector being directed towards said apertured end.

2. A device for radiating ultra-high frequency waves comprising in combination: a parabolic mirror, a wave guide extending through said mirror at a point close to the parabolic apex thereof and terminating in an apertured end in close proximity to the parabolic focus, and a conical reflector facing the said apertured end located outwardly of the focus along the axis of said mirror and near to the focus and in the interior of the boundaries of said mirror, the base section of this reflector being substantially less than the mirror opening, the apex of said reflector being directed towards said apertured end.

3. A device for radiating ultra-high frequency waves comprising in combination: a parabolic mirror, a wave guide extending through said mirror at a point close to the parabolic apex thereof and terminating in an apertured end in close proximity to the parabolic focus, a conical reflector facing the said apertured end located outwardly of the focus along the axis of said mirror and near to the focus and in the interior of the boundaries of said mirror, the base section of this reflector being substantially less than the mirror opening, and a truncated conical reflector having its smaller base coinciding with said apertured end, the apices of said conical reflectors being opposed.

HENRI GUTTON.

REFERENCES CITED

The following references are of record in the file of this patent:

UNITED STATES PATENTS

| Number | Name | Date |
|---|---|---|
| 2,054,896 | Dallenbach | Sept. 22, 1936 |
| 2,112,282 | Fritz | Mar. 29, 1938 |
| 2,115,788 | Scharlau | May 3, 1938 |
| 2,203,807 | Wolff | June 11, 1940 |
| 2,206,923 | Southworth | July 9, 1940 |
| 2,370,053 | Lindenblad | Feb. 20, 1945 |
| 2,416,698 | King | Mar. 4, 1947 |

FOREIGN PATENTS

| Number | Country | Date |
|---|---|---|
| 114,368 | Australia | Dec. 9, 1941 |
| 757,420 | France | Dec. 26, 1933 |